United States Patent [19]

Sugano

[11] Patent Number: 4,575,134
[45] Date of Patent: Mar. 11, 1986

[54] PIPE JOINT CONSTRUCTION

[75] Inventor: Mitsutoshi Sugano, Sano, Japan

[73] Assignee: Nihon Radiator Co., Ltd., Tokyo, Japan

[21] Appl. No.: 630,365

[22] Filed: Jul. 11, 1984

[30] Foreign Application Priority Data

Jul. 13, 1983 [JP] Japan .......................... 58-107609[U]

[51] Int. Cl.$^4$ .............................................. F16L 19/02
[52] U.S. Cl. ..................................... 285/353; 285/382
[58] Field of Search ..................... 285/353, 354, 382.5, 285/382.4, 334.4, 382

[56] References Cited

U.S. PATENT DOCUMENTS

| | | | |
|---|---|---|---|
| 1,326,970 | 1/1920 | Row et al. | 285/334.4 X |
| 1,533,886 | 4/1925 | Mueller et al. | 285/382.5 X |
| 2,463,883 | 3/1949 | Kinsey | 285/354 X |
| 2,613,958 | 10/1952 | Richardson | 285/353 X |
| 3,092,404 | 6/1963 | MacWilliam | 285/354 X |
| 3,357,725 | 12/1967 | Champion | 285/382.5 X |
| 3,393,930 | 7/1968 | Ziherl | 285/354 X |

FOREIGN PATENT DOCUMENTS 55-29750  2/1980  Japan .
 406764   3/1934  United Kingdom ............... 285/353

Primary Examiner—Thomas F. Callaghan
Attorney, Agent, or Firm—Gordon W. Hueschen

[57] ABSTRACT

A pipe joint construction for joining two pipes by having a bead formed on the outer side near the end of one of the pipes being joined and a radially expanded portion for embracing therein a sealing member fitted around the base of said bead formed near the end of the other pipe, setting in position a union screw with the inner end surface thereof in engagement with said radially expanded portion and a nut with the inner end surface thereof in engagement with said beads, and screw tightening the union screw and the nut against each other thereby pressing the leading end of said radially expanded portion into contact with said beads, which pipe joint construction has a tapered portion formed along the inner circumferential edge of the leading end of said union screw so that the leading end of said radially expanded portion will be deformed along the outer circumferential surface of said bead.

5 Claims, 6 Drawing Figures

PIPE JOINT CONSTRUCTION

BACKGROUND OF THE INVENTION

1. Field of the Invention

This invention relates to a pipe joint construction. More particularly, this invention relates to a pipe joint construction for use in a coolant pipe laid in an air conditioner on an automobile, for example.

2. Description of Prior Art

As is widely known, the air conditioner on the automobile, for example, is provided with a coolant pipe forming a cooling cycle system and a hot water pipe forming a warming cycle system and is operated to cool or warm the space in the automobile by leading a coolant or a hot water such as engine cooling water to a heat exchanger, there to absorb or radiate heat and cool or heat the air.

To complete the cooling cycle system and the warming cycle system as prescribed by using pipes, all the adjoining pipes are joined with joints. Various joint constructions have been proposed for the union of such pipes. In the joint construction illustrated in FIG. 1 and FIG. 2, for example, a pipe joint 1 comprises a nut 3 adapted to collide against the rear side surface 2a of a bead 2 formed at the leading end of a first pipe $P_1$ and a union screw 7 having an inner end surface 6 thereof adapted to collide against a radially expanded portion 5 formed at the leading end of a second pipe $P_2$ for embracing therein an O-ring 4 fitted on the terminal side base of the aforementioned bead 2, so that the pipe joint 1 will connect the first pipe $P_1$ and the second pipe $P_2$ while sealing the adjoining pipe ends by compressing the O-ring 4 between the circumferentially opposed pipe surfaces.

This joint construction, however, has the possibility that the aforementioned bead 2 will sustain damage when the nut 3 is tightened excessively against the union screw 7 or when the tightening is repeated time and again. In the union or disunion of any pipe joint of this kind, two wrenches of exclusive specifications are used, one for keeping the union screw 7 in a fixed state and the other for rotating the nut 3 until the pipe ends are joined. During the tightening work of this nature, the torque generated cannot be easily controlled. If this tightening is given to any excess, the leading end 8 of the inner end surface 6 of the union screw may deform the end part 5a of the radially expanded portion 5 of the second pipe $P_2$ possibly to flatten the end part 5a and push the surplus of the wall thickness upwardly in the position as illustrated. Once this deformation occurs, an attempt to move the nut 3 toward the right in the illustrated position for disunion of the pipe joint 1 may end up in failure because the apex of the end part 5a of the aforementioned radially expanded portion 5 rises to a height of h above the level of the leading end 9 of the female thread of this nut 3. A decrease of the height of the end part 5a of the radially expanded portion 5 may appear to be an effective solution for this disadvantage. The work of decreasing this height, however, is very difficult because of dimensional tolerance of working.

Further, the radially expanded portion 5 is never allowed to deform inwardly because the distance l between the inner end surface of this radially expanded portion 5 and the outer wall surface 10a of the leading end 10 of the first pipe $P_1$ is rigidly controlled to warrant a contraction of the O-ring 4 (normally about 25% of the diameter of the O-ring). In this respect, the tightening work of the aforementioned nut 3 and union screw 7 calls for great care. Particularly in a narrow space such as in the engine room, this work entails unusual difficulty.

Japanese Utility Model Laid-Open No. SHO 55(1980)-29,750 discloses a metal pipe joint construction characterized in that a half union screw and a flared nut on the pipe joint are so designed that their opposed end walls will come into intimate mutual contact when one of the metal pipes to be joined has its end portion tapered outwardly toward the end and the other metal pipe has a substantially perpendicularly extended flange portion formed in the portion approximating the end thereof and a tubular portion suitable for insertion into the opposite metal pipe formed in the further leading portion thereof, a resilient sealing material is inserted in the annular space of a triangular cross section defined by the aforementioned tapered end and the flange portion and the tubular portion and, with the half union screw and the flared nut fitted around the two metal pipes, the aforementioned tapered end is brought into contact with the flange portion and further pressed thereagainst so as to be slightly deformed. This joint construction is substantially equal to the joint construction of FIG. 1 and FIG. 2, except that the metal pipe provided with the tapered end possesses no radially expanded portion in the part approximating the end thereof. Thus, it has the same problem.

An object of this invention, therefore, is to provide a novel pipe joint construction.

Another object of this invention is to provide a pipe joint construction which, despite the tightening work performed by the same procedure as followed heretofore, never encounters the situation that the nut will become inseparable.

SUMMARY OF THE INVENTION

These objects are accomplished by a pipe joint construction for joining two pipes by having a bead formed on the outer side near the end of one of the pipes being joined and a radially expanded portion for embracing therein a sealing member fitted around the base of the aforementioned bead formed near the end of the other pipe, setting in position a union screw with the inner end surface thereof in engagement with the aforementioned radially expanded portion and a nut with the inner end surface thereof in engagement with the aforementioned beads, and screw tightening the union screw and the nut against each other thereby pressing the leading end of the aforementioned radially expanded portion into contact with the aforementioned beads, which pipe joint contruction has a tapered portion formed along the inner circumferential edge of the leading end of the aforementioned union screw so that the leading end of the aforementioned radially expanded portion will be deformed along the outer circumferential surface of the aforementioned bead.

PREFERRED EMBODIMENT OF THE INVENTION

Figure 1:
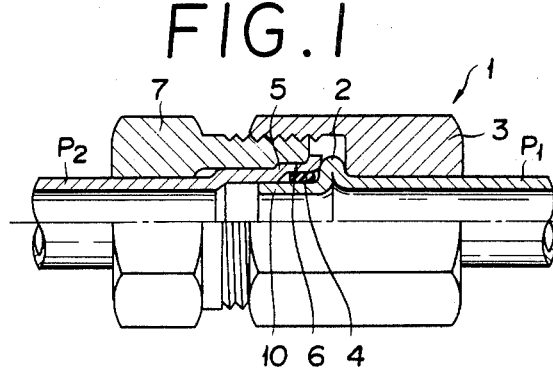
FIG. 1 is a half-sectioned side view illustrating a conventional pipe joint construction.
Figure 2:
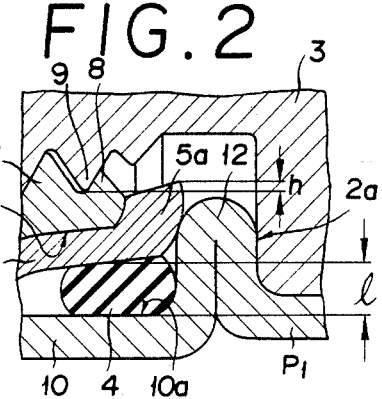
FIG. 2 is an enlarged cross sectional view of the essential part of the pipe joint construction of FIG. 1.
Figure 3:
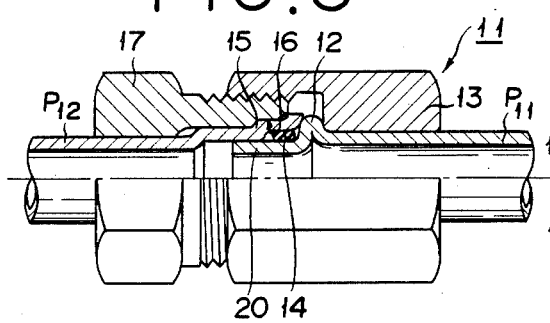
FIG. 3 is a half-sectioned side view illustrating a pipe joint construction of the present invention.

Now, this invention will be described below with reference to FIGS. 3–6. A pipe joint 11 of this invention is so constructed that two given pipes $P_{11}$, $P_{12}$ are joined to each other by having a nut 13 disposed in contact with the rear end surface 12a of a bead 12 formed near the end of the first pipe $P_{11}$ and a union screw 17 disposed with the inner end surface thereof in contact with a radially enlarged portion 15 formed near the end of the second pipe $P_{12}$ and adapted to embrace therein a sealing member 14 such as an O-ring fitted around the end side base of the aforementioned bead and screw tightening the nut 13 and the union screw 17 against each other thereby compressing the aforementioned O-ring 14. In this pipe joint 11, the union screw 17 is provided along the inner circumferential edge of the leading end thereof with a tapered portion 21 and the leading end 15a of the radially expanded portion 15 of the aforementioned second pipe $p_{12}$ possesses a substantially upright piece 15c rising from the base thereof 15b, so that the upright piece 15c and the aforementioned tapered portion 21 will give rise to an empty space 22 therebetween. The angle the aforementioned tapered portion 21 forms relative to the inner circumferential edge of the union screw 17 is generally in the range of 30° to 60°, more desirably in the range of 44° to 46°, and most desirably 45°.

Now, the tightening of the pipe joint 11 construction as described above will be described. First, the first pipe $P_{11}$ is inserted in the nut 13 and the second pipe $P_{12}$ is inserted into the union screw 17. Then the nut 13 and the union screw 17 are helically joined and are lightly tightened. As the tightening is continued, the leading end 15a of the second pipe $P_{12}$ continues its advance toward the bead 12 of the first pipe $P_{11}$ until their mutual collision. At this time, the empty space 22 is formed between the tapered portion 21 of the union screw 17 and the leading end 15a of the radially expanded portion 15.

Figure 5:
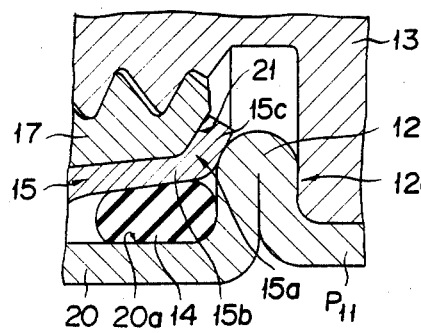

As the tightening is further continued from this point, the aforementioned upright piece 15c is increasingly pressed by the leading end 17a of the union screw 17 and eventually bent about the base 15b as the center to assume the state draping the tapered portion 21 as illustrated in FIG. 5. At this point, the torque of tightening is increased to a fairly large level, allowing the operator to tell that the tightening work has advanced to the prescribed level. If the tightening is further continued, the upright piece 15c between the tapered portion 21 and the bead 12 is thinned out and the surplus of the wall of the uptight portion 15c tends to rise upwardly in the illustrated position.

Figure 6:
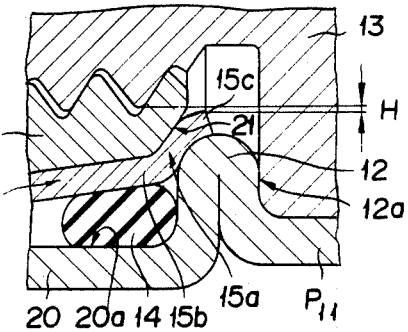

This surplus of the wall is pressed down by the tapered portion 21 and, therefore, is compelled to be deformed along the outer wall surface of the bead 12 as illustrated in FIG. 6. As the result, the leading end of the upright piece 15c is caused by the tapered portion 21 to extend further downwardly. Thus, it is not allowed to rise above a prescribed level and is increasingly deformed along the outer circumferential surface of the bead 2. A positional difference indicated as H, accordingly, occurs between the leading end of the upright piece 15c and the apex of the thread 19 of the nut 3.

Owing to this positional difference, no part of the surplus of the wall of the second pipe $P_{12}$ will offer any obstacle when the nut 3 is loosened and removed from the pipe joint.

During the tightening work, since the tapered portion applies pressure, the tightening force is hardly allowed to increase beyond the prescribed level and the upright piece 15c is not cut between the bead 12 and the leading end of the union screw 17.

Figure 4:
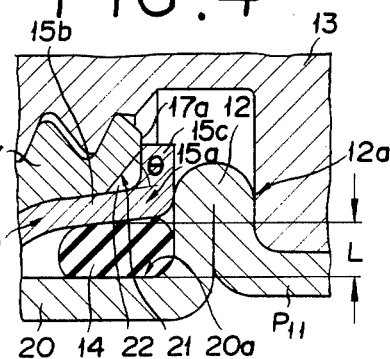
FIGS. 4–6 are cross sectional views illustrating the essential part of the pipe joint construction of FIG. 3 as altered along the process of tightening work.

The symbol L found in FIG. 4 represents the distance between the inner end surface of the radially expanded portion 15 of the second pipe $P_{12}$ and the outer circumferential surface 20a of the leading end 20 of the first pipe $P_{11}$.

In the embodiment so far described, the angle $\theta$ of the tapered portion is illustrated to be 45°. Actually, this angle may be suitably selected in due consideration of the kind of material used, the wall thickness of the pipe, and other factors.

As is clear from the foregoing description, this invention requires a tapered portion to be formed along the inner circumferential edge of the leading end of the union screw so as to enable the leading end of the radially expanded portion to be deformed along the contour of the bead. Thus, the surplus of the wall which is produced during the tightening of the pipe will not offer any hindrance to the removal of the nut from the pipe joint. When the torque of tightening is increased, the excess torque will go to push the inclined surface and, therefore, is dispersed and is prevented from crushing the pipe. Moreover, the force of tightening is hardly allowed to increase beyond the prescribed level. The pipe joint construction provided by the present invention, therefore, proves particularly useful for joining pipe ends in a piping distributed in an automobile air conditioner system which has problems when the nut is tightened excessively by a usual spanner in case of no torque wrench or when the tightening is repeated time and again.

What is claimed is:

1. In a pipe joint construction for joining two pipes characterized by having a bead formed on the outer side near the end of one of said pipes, a sealing member fitted around the base of said bead on the end side of said one pipe, and a radially-expanded portion near the end of the other of said pipes for embracing said sealing member; said radially-expanded portion having a flared end; a union screw with the inner end surface thereof in engagement with said radially-expanded portion and the flared end thereof; and a union nut with the inner end surface thereof in engagement with said bead, whereby tightening the union screw and the nut against each other presses the flared end of said radially-expanded portion into contact with said bead, the improvement in which the inner circumferential edge of the leading end of said union screw is beveled so that the upper portion of the bevel first engages said flared end of said radially-expanded portion and then deforms it along the outer circumferential surface of said bead when said union screw and said nut are screw tightened.

2. A pipe joint construction according to claim 1, wherein the angle of said bevel relative to the inner circumferential edge of the leading end of said union screw is in the range of 30° to 60°.

3. A pipe joint construction according to claim 1, wherein the angle of said bevel relative to the inner circumferential edge of the leading end of said union screw is in the range of 44° to 46°.

4. A pipe joint construction according to claim 1, wherein said bead extends outwardly substantially perpendicularly relative to the axis of the pipe.

5. A pipe joint construction according to claim 1, wherein the angle of said bevel relative to the inner circumferential edge of the leading end of said union screw is 45°.

* * * * *

UNITED STATES PATENT AND TRADEMARK OFFICE
CERTIFICATE OF CORRECTION

PATENT NO. : 4,575,134

DATED : March 11, 1986

INVENTOR(S) : Mitsutoshi Sugano

It is certified that error appears in the above-identified patent and that said Letters Patent is hereby corrected as shown below:

Col. 1, line 63; "1" should read -- $\ell$ --

Signed and Sealed this

Fifth Day of August 1986

[SEAL]

Attest:

DONALD J. QUIGG

Attesting Officer

Commissioner of Patents and Trademarks